(12) United States Patent
Tang et al.

(10) Patent No.: US 12,548,375 B2
(45) Date of Patent: Feb. 10, 2026

(54) FRAUD DETECTION FOR SIGNED DOCUMENTS

(71) Applicant: PAYPAL, INC., San Jose, CA (US)

(72) Inventors: Quan Jin Ferdinand Tang, Singapore (SG); Jiyi Zhang, Singapore (SG); Jiazheng Zhang, Singapore (SG); Shanshan Peng, Singapore (SG); Jia Wen Lee, Singapore (SG)

(73) Assignee: PAYPAL, INC., San Jose, CA (US)

( * ) Notice: Subject to any disclaimer, the term of this patent is extended or adjusted under 35 U.S.C. 154(b) by 602 days.

(21) Appl. No.: 18/051,580

(22) Filed: Nov. 1, 2022

(65) Prior Publication Data

US 2024/0144728 A1 May 2, 2024

(51) Int. Cl.
*G06V 40/30* (2022.01)
*G06Q 50/26* (2024.01)
*G06V 10/70* (2022.01)
*G06V 30/18* (2022.01)
*G06V 30/19* (2022.01)
*G06V 30/416* (2022.01)

(52) U.S. Cl.
CPC ............ *G06V 40/33* (2022.01); *G06Q 50/265* (2013.01); *G06V 10/70* (2022.01); *G06V 30/18* (2022.01); *G06V 30/19093* (2022.01); *G06V 30/416* (2022.01)

(58) Field of Classification Search
CPC ........ G06V 40/33; G06V 10/70; G06V 30/18; G06V 30/19093; G06V 30/416; G06Q 50/265
See application file for complete search history.

(56) References Cited

PUBLICATIONS

Hafemann et al., "Learning features for offline handwritten signature verification using deep convolutional neural networks," Pattern Recognition, 70, 2017, pp. 163-176. (Year: 2017).*
Gideon et al., "Handwritten Signature Forgery Detection using Convolutional Neural Networks," Procedia Computer Science, 143, 2018, pp. 978-987. (Year: 2018).*
Lovell et al., "An Automatic Off-Line Signature Verification and Forgery Detection System," Pattern Recognition Technologies and Applications: Recent Advances, 2008. (Year: 2008).*

(Continued)

*Primary Examiner* — Vincent Rudolph
*Assistant Examiner* — Daniella M. DiGuglielmo
(74) *Attorney, Agent, or Firm* — Haynes and Boone, LLP (70481)

(57) ABSTRACT

Methods and systems are presented for signed document image analysis and fraud detection. An image of a document may be received from a user's device. A first layer of a machine learning engine is used to identify a signature and a name of the user within different areas of the received image. A second layer of the machine learning engine is used to extract a plurality of features from the different areas of the image. The plurality of features includes at least one visual feature representing the signature and at least one textual feature representing the name. A combined feature representation of the signature and the name is generated based on the plurality of features extracted from the image. A third layer of the machine learning engine is used to determine whether the signature of the user has been digitally altered, based on the combined feature representation.

20 Claims, 7 Drawing Sheets

(56) References Cited

PUBLICATIONS

Analysis tab of the FAQ page at https://fotoforensics.com/faq.php?show=Analysis.

Popescu et al., "Exposing Digital Forgeries in Color Filter Array Interpolated Images," IEEE Transactions on Signal Processing, vol. 50, No. 10, pp. 3948-3959, Nov. 2005.

Barhoom, et al., "Handwritten Signature Verification using Deep Learning," International Journal of Academic Multidisciplinary Research (IJAMR), vol. 3, Issue 12, Dec. 2019, pp. 39-44.

Dang et al., "On the Detection of Digital Face Manipulation," 2020, http:/arxiv.org/abs/cs.CV/1910.01717.

Gideon et al., "Handwritten Signature Forgery Detection using Convolutional Neural Networks," Procedia Computer Science, vol. 143, 2018, pp. 978-987, 8th International Conference on Advances in Computing Communications (ICACC-2018).

Hafemann et al., "Learning Features for Offline Handwritten Signature Verification Using Deep Convolutional Neural Networks," Pattern Recognition, vol. 70, Oct. 2017, pp. 163-176.

Huh et al., "Fighting Fake News: Image Splice Detection via Learned Self-Consistency," 2018, http:/arxiv.org/abs/cs.CV/1805.04096.

Lovell et al., "An Automatic Off-Line Signature Verification and Forgery Detection System," Pattern Recognition Technologies and Applications: Recent Advances, Jan. 2008.

\* cited by examiner

FRAUD DETECTION FOR SIGNED DOCUMENTS

TECHNICAL FIELD

The present application generally relates to digital image analysis and forgery detection, and particularly, to machine-learning based analysis and detection of fraudulent document images with forged signatures.

BACKGROUND

Forgery in proof-of-identity (POI) or photo identity (ID) documents (e.g., a driver's license, passport, etc.) has caused significant amounts of losses for companies every year. In many cases, a company, e.g., an online service provider, may require the submission of an image of a POI document from a user to verify the user's identity and grant the user access to the functionalities and/or data associated with company's product or service. By verifying the identity of the user using the POI document image, the risk of the user performing malicious transactions (e.g., abusing the functionalities of the company's platform) may be greatly reduced. However, when the image of the POI document is forged (e.g., the POI document includes a fake signature of the user that has been digitally altered to appear legitimate), an unauthorized user may be granted access to functionalities and data that should not have been granted if the forgery had been detected from the POI document submitted during the identity verification process.

Many fraudulent POI documents include signatures that are computer-generated forgeries with fonts that look like they were written by human hands. As the computer-generated signatures appear visually identical to hand-written signatures, such forgeries are hard to detect with existing forgery detection systems and human reviewers. Traditional image analysis techniques for forgery detection typically require analyzing computer graphics features of an image, for example, error level analysis of compression ratio differences or statistical analysis of image patterns. Such traditional methods, however, have either limited accuracy or require manual post-processing of the image. Other conventional solutions aim to detect whether a signature in a POI document image is written by a target person. However, this requires comparing the signature with a reference signature, which may not be available for the person in question.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

Figure 1:
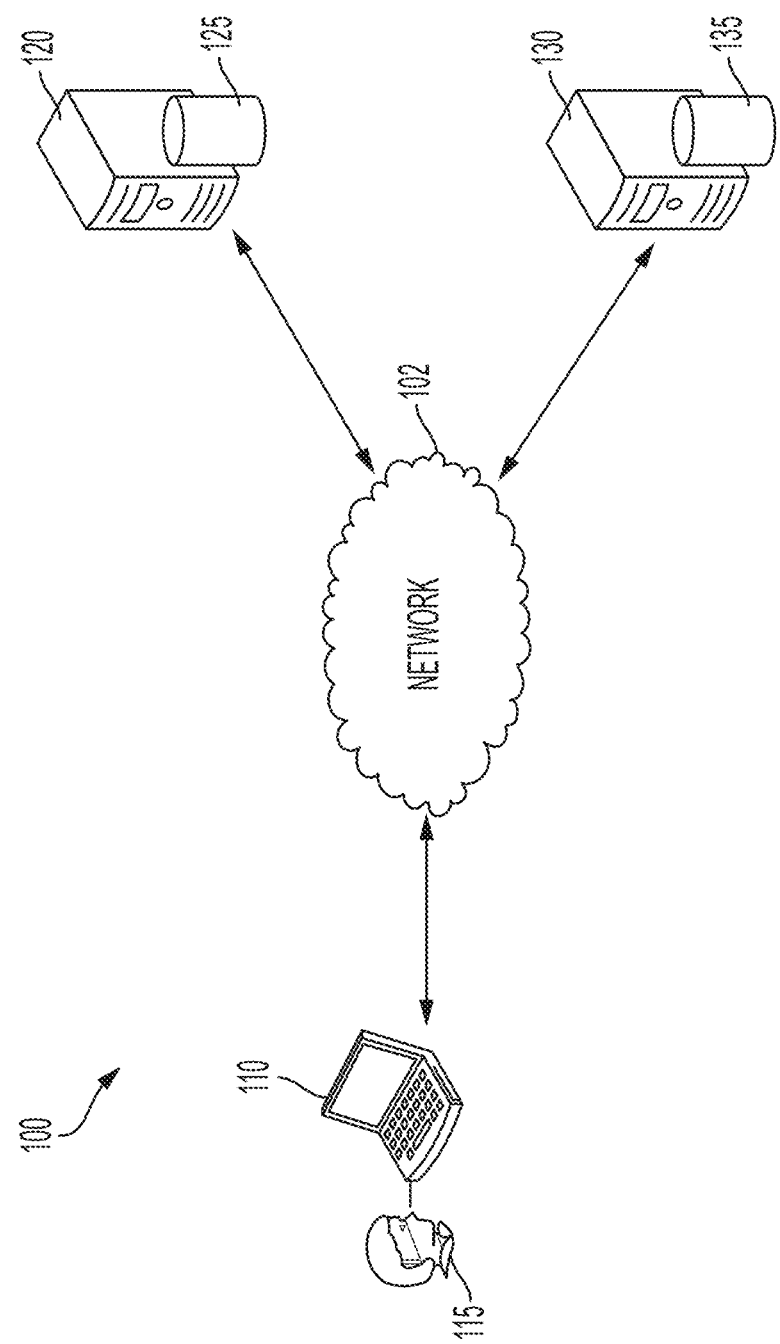
FIG. 1 is a block diagram of a distributed client-server system in accordance with one or more embodiments of the present disclosure.

Embodiments of the present disclosure are directed to machine learning (ML) based analysis and detection of fraudulent document images with digitally altered or forged signatures. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to provide fraud detection for images of signed documents associated with users of a service provider. For example, a user may send an image of a proof-of-identity (POI) or user identification (ID) document including information that the service provider may use to identify the user, such as the user's name and signature. Examples of such POI documents include, but are not limited to, a driver's license, a passport, a government-issued ID card, or any other document with user identification information, including a signature of the user. In some embodiments, the image may be sent to the service provider from a device of the user as part of a request for access to features or content of a web service associated with the service provider. The service provider may perform, for example, an automated identity verification process using the disclosed image analysis and fraud detection techniques to verify the user's identity based on the image of the document received from the user's device.

In some embodiments, the image analysis may be performed using a multi-layered machine learning (ML) framework or engine with various machine learning models to detect whether the signature of the user in the above example has been digitally altered, e.g., using image editing software, and thereby determine whether the document image is fraudulent. The ML engine may include, for example, four main components: (1) signature localization; (2) name entity recognition; (3) visual-textual (V-T) similarity embedding; and (4) classification. Given the image of the POI document in the above example, the ML framework may first detect and extract visual and textual features of the user's signature and name from different areas of the image. These features may then be used to generate a combined feature representation of the name and the signature, e.g., a V-T similarity embedding. The combined feature representation (V-T similarity embedding) may be fed to a trained ML model, which determines whether the signature of the user has been digitally altered. In some implementations, the ML model may be a binary classifier that receives the V-T similarity embedding as an input and that produces an output in the form of a binary decision indicating whether the signature is a digital forgery or not. Accordingly, the disclosed techniques may be used to provide automated identity verification with signed document image analysis and fraud detection to appropriately assess the risk of granting a user access to requested web services and restrict access in cases where a user's signature in a POI document image may appear genuine but is in fact a digital forgery.

The terms "online service," "web service," and "web application" are used interchangeably herein to refer broadly and inclusively to any type of website, application, service, protocol, or framework accessible via a web browser, or other client application executed by a computing device, over a local area network, medium area network, or wide area network, such as the Internet. In some embodiments, the signed document image analysis and fraud detection techniques disclosed herein may be implemented as a web application or service of an online service provider alongside other network or online services (e.g., online payment processing services) offered by the service provider. While various embodiments will be described below with respect to FIGS. 1-7 in the context of payment processing services provided by an online payment service provider, it should be appreciated that embodiments are not intended to be limited thereto and that the disclosed techniques may be applied to any type of web service or application provided by a network or online service provider. Also, while various embodiments will be described in the context of POI or user ID documents, it should be appreciated that embodiments are not intended to be limited thereto and that the disclosed techniques may be applied to any image of a signed document with a user's name and signature susceptible to digital alteration or forgery.

FIG. 1 is a block diagram of a distributed client-server system 100 in accordance with an embodiment of the present disclosure. System 100 includes a client device 110 of a user 115, a server 120, and a server 130, all of which are communicatively coupled to one another via a network 102. Client (or user) device 110 may be any type of computing device with at least one processor, local memory, display, and one or more input devices (e.g., a mouse, QWERTY keyboard, touchscreen, microphone, or a T9 keyboard). Examples of such computing devices include, but are not limited to, a mobile phone, a personal digital assistant (PDA), a computer, a cluster of computers, a set-top box, or similar type of device capable of processing instructions. Each of servers 120 and 130 may be any type of computing device, e.g., a web server or application server, capable of serving data to device 110 or each other over network 102.

Network 102 may be any network or combination of networks that can carry data communication. Such a network may include, but is not limited to, a wired (e.g., Ethernet) or a wireless (e.g., Wi-Fi and 3G) network. In addition, network 102 may include, but is not limited to, a local area network, a medium area network, and/or a wide area network, such as the Internet. Network 102 may support any of various networking protocols and technologies including, but not limited to, Internet or World Wide Web protocols and services. Intermediate network routers, gateways, or servers may be provided between components of system 100 depending upon a particular application or environment. It should be appreciated that the network connections shown in FIG. 1 are illustrative and any means of establishing a communications link between the computers may be used. The existence of any of various network protocols such as TCP/IP, Ethernet, FTP, HTTP, and the like, and of various wireless communication technologies such as GSM, CDMA, Wi-Fi, and LTE, is presumed, and the various computing devices described herein may be configured to communicate using any of these network protocols or technologies.

In some embodiments, a service provider may use server 120 to provide one or more online or web services. For example, server 120 may be used to provide a payment processing service of the service provider for processing payments in connection with online transactions between different entities via network 102. Such transactions may include, but are not limited to, payments or money transfers between different users of the service provider. It should be appreciated that the term "users" herein may refer to any individual or other entity (e.g., a merchant or other online service provider) who uses or requests access to use the web service(s) of the service provider. In FIG. 1, for example, user 115 of device 110 may initiate a transaction for the purchase of one or more items sold by a merchant at a physical store or via an online marketplace hosted at server 130 over network 102. The online marketplace in this example may be accessed by user 115 via a web browser or other client application executable at device 110. The online marketplace may provide a checkout option for user 115 to select the payment processing service offered by the service provider at server 120 to complete payment for the purchase. By selecting this option, user 115 may initiate a payment transaction for transferring funds to the merchant from a specified bank account, digital wallet, or other funding source associated with an account of user 115 with the service provider. The payment processing service may assist with resolving electronic transactions through validation, delivery, and settlement of account balances between user 115 and the merchant in this example, where accounts may be directly and/or automatically debited and/or credited using monetary funds in a manner accepted by the banking industry.

It should be appreciated that access to the web service (e.g., payment processing service) may be restricted to only those users who have accounts registered with the service provider. Therefore, user 115 may be required to provide authentication credentials for either logging into an existing account or registering a new account with the service provider, e.g., via an account login page or new account registration page served by server 120 and displayed at device 110. The authentication credentials may be stored along with other relevant account information, e.g., name and other identity attributes, associated with user 115's account, in a database 125 coupled to or otherwise accessible to server 120. In some implementations, a similar account authentication scheme may be employed by the merchant associated with server 130 to authenticate user 115 for transactions involving the purchase of items from the merchant's online marketplace. The authentication credentials and other account information for an account of user 115 with the merchant may be stored in a database 135 coupled to server 130. Each of databases 125 and 135 may be any type of data store or recordable storage medium configured to maintain, store, retrieve, and update information for servers 120 and 130, respectively.

In some embodiments, the authentication credentials that user 115 must provide to the service provider for web service access may include an image of a POI or user ID document with identification information (e.g., a name and a signature), which server 120 can use to verify the identity of user 115 before authorizing access. The image may be included in a request for web service access received by server 120 from user device 110 via network 102. It should be appreciated that the types of requests for which the service provider requires a POI document image for user identity verification may vary as desired for a particular implementation. In some implementations, for example, the service provider may impose this POI document requirement on all requests for web service access received by server 120. Alternatively, the POI document requirement may be limited to only certain types of requests. Examples of requests that may require a POI document image for user identity verification include, but are not limited to, a request to create or register a new user account with the service provider, a request to view or retrieve confidential information (e.g., bank account numbers) associated with an existing user account, a request to remove a restriction associated with an existing user account, a request to add a secondary user to an existing account associated with a primary user, and any other request to make changes to an existing user account.

In some embodiments, the service provider may also use server 120 to implement a fraud detection service for signed document image analysis and fraud (or digital forgery) detection, e.g., as part of an automated identity verification process to verify user 115's identity in response to receiving a request for web service access from device 110 via network 102. Such a fraud detection service may operate alongside other services (e.g., the payment processing service) offered by the service provider to appropriately assess the risk of granting a user (e.g., user 115) access to requested web services, as will be described in further detail below with respect to FIGS. 2-7.

Figure 2:
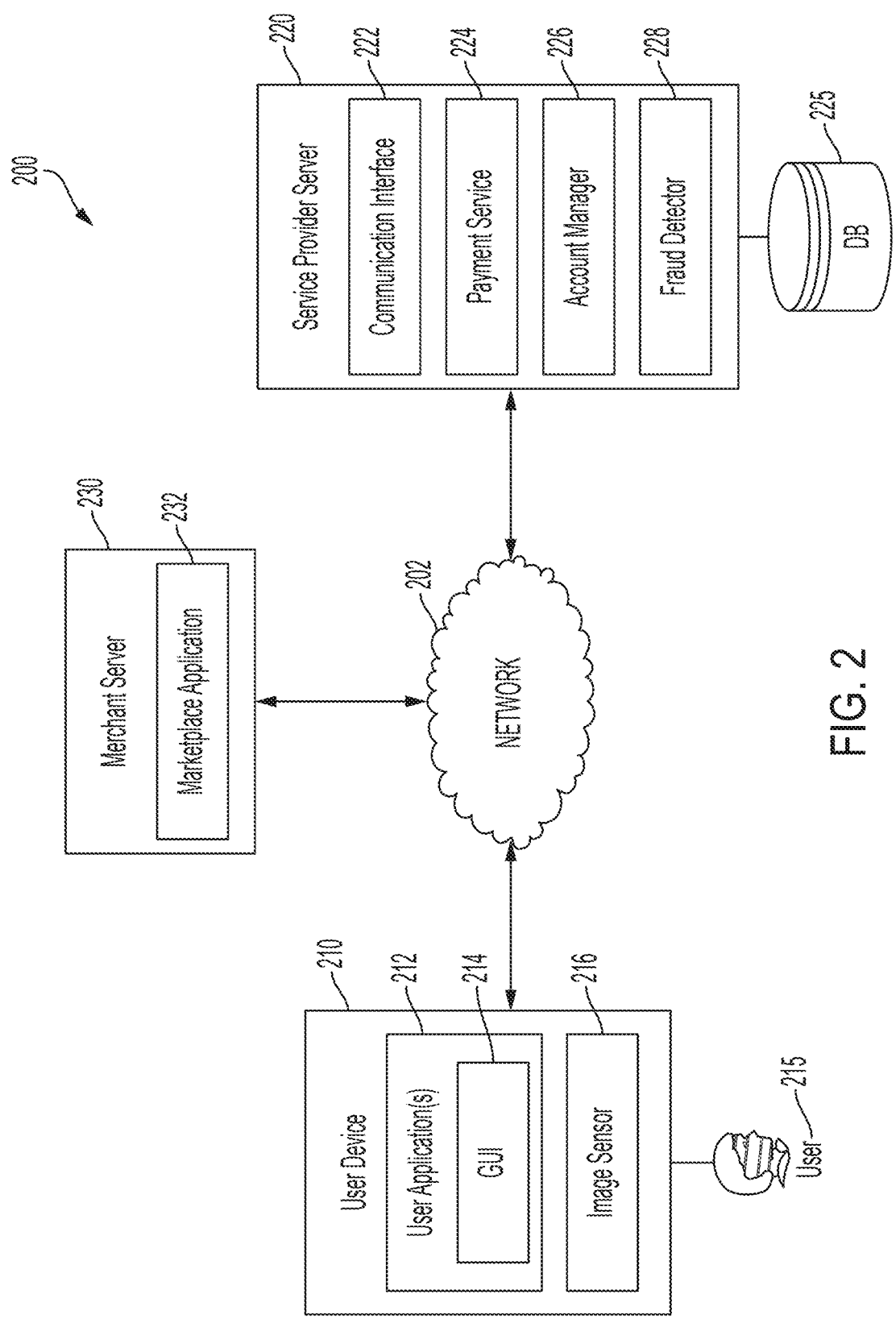
FIG. 2 is a block diagram of a network communication system for detecting fraudulent documents with digitally altered or forged signatures, in accordance with one or more embodiments of the present disclosure.

FIG. 2 is a block diagram of a network communication system 200 for detecting fraudulent documents with digitally altered or forged signatures, in accordance with one or more embodiments of the present disclosure. For discussion purposes, system 200 will be described using system 100 of FIG. 1, as described above, but system 200 is not intended to be limited thereto. As shown in FIG. 2, system 200 includes a user device 210, a service provider server 220, and a merchant device 230. User device 210 may be implemented using, for example, client device 110 of FIG. 1, as described above. Service provider server 220 and merchant server 230 may be implemented using, for example, servers 120 and 130 of FIG. 1, respectively, as described above. User device 210 along with servers 220 and 230 may be communicatively coupled to one another via a network 202. Each of user device 210, server 220, and server 230 may be implemented using any appropriate combination of hardware and software configured for wired and/or wireless communication over network 202. Network 202 may be implemented using, for example, network 102 of FIG. 1, as described above.

In some embodiments, user device 210 executes one or more user applications 212 that a user 215 may use to access the functionality of one or more web services via network 202. Such web services may include, for example, a payment service 224 provided by a service provider using service provider server 220. In some embodiments, the service provider may be an online payment service provider or payment processor, and payment service 224 may include various payment processing services for transactions between different entities. Such transactions may include, for example, transactions between user 215 and a merchant associated with an online marketplace application 232 executable at merchant server 230. Examples of payment processing services offered by the service provider as part of payment service 224 include, but are not limited to, payment account establishment and management, fund transfers, digital wallet services, and reimbursement or refund services.

In some embodiments, user application(s) 212 may include any of various application programs (e.g., a web browser, a mobile payment application, etc.) executable at user device 210 for accessing the functionality of payment service 224 and marketplace application 232 via corresponding websites hosted at service provider server 220 and merchant server 230, respectively. For example, user 215 may interact with a graphical user interface (GUI) 214 of the respective user application(s) 212 using a user input device (e.g., mouse, keyboard, or touchscreen) of user device 210 to communicate with the service provider server 220 and/or merchant server 230 over network 202 for submitting various types of requests (e.g., payment transaction requests) that require access to features of payment service 224 and/or marketplace application 232, respectively.

In some implementations, user application(s) 212 may include a client-side payment service application that interfaces with service provider server 220 over network 202 to facilitate online payment transactions over network 202. Such a client-side service application may also be used to implement security protocols that may be required by payment service 224. Such protocols may include, for example, user identity verification and fraud detection protocols that require user 215 to submit a proof-of-identity (POI) document, which service provider server 220 may use to verify user 215's identity before authorizing access to payment service 224, as will be described in further detail below.

In some embodiments, service provider server 220 may include a communication interface 222 for receiving requests from user 215 and other users of payment service 224 over network 202 and serving content (e.g., web content) in response to the received requests. For example, communication interface 222 may be configured to serve web content for display via GUI 214 of user application(s) 212 in response to HTTP requests received from user device 210 via network 202. Communication interface 222 may also be used to interact with user 215 through user application(s) 212 installed at user device 210 via one or more protocols (e.g., RESTAPI, SOAP, etc.). The content served by service provider server 220 using communication interface 222 may include, for example, static (pre-generated) or dynamic electronic content related to payment service 224. The type of content that is served may vary according to the type of request and/or account status of the requesting user (e.g., existing users of the service provider with registered accounts vs. new users who do not have registered accounts). For example, a new account registration page (or account login page that includes an option to register a new account) may be served by server 220 in response to any request for access to payment service 224 received from an unrecognized user device or a device of any user who does not have a registered account with the service provider. It should also be appreciated that any of various network or other communication interfaces may be used for sending and receiving different types of requests and other communications to and from user devices and applications, as desired for a particular implementation. In some implementations, communication interface 222 may be an application programming interface (API) of service provider server 220, which interfaces with user application(s) 212 for enabling various features of payment service 224 over network 202.

Service provider server 220 may be configured to maintain accounts for different entities or users of payment service 224 (e.g., user 215 and the merchant associated with merchant server 230). The account(s) and associated information for each entity/user may be stored in a database (DB) 225 coupled to service provider server 220. In some embodiments, the account information stored in DB 225 may be managed by an account manager 226 of service provider server 220. DB 225 may be any type of data store for storing information accessible to service provider server 220. DB 225 may be implemented using, for example, database 125 of FIG. 1, as described above. In some embodiments, account information for each registered user of the service provider may be stored in DB 225 with a unique identifier and other information relevant to each user account. Such account information may include, for example and without limitation, login credentials (e.g., username and password information), personal contact information (e.g., mailing address and phone numbers), banking information (e.g., bank account numbers and other private financial information related to one or more funding sources, such as digital wallets), and other identity attributes (e.g., Internet Protocol (IP) addresses, device information, etc.).

In some implementations, the identity attributes for each user (and any associated account) may be passed to service provider server 220 as part of a login, search, selection, purchase, payment, or other transaction initiated by the user over network 202. For example, user 215 may interact with user application(s) 212 at user device 210 to access certain features of payment service 224 or information associated with a particular account stored in DB 225. User 215's interactions may generate one or more HTTP requests directed to service provider server 220. Account manager 226 may use the information received from user device 210, e.g., as part of a request for access to payment service 224, to authenticate or verify the identity of the user before authorizing access to information associated with a particular account stored in DB 225 or access to features of payment service 224 in general.

For certain types of access requests (e.g., a request to register a new user account or access confidential information associated with an existing user account), service provider server 220 may require user 215 to submit a copy of a POI document for identity verification. As described above, the POI document may be any of various documents (e.g., driver's license, ID card, passport, etc.) including identification information (e.g., a name and a signature) for user 215, which service provider server 220 may use to verify user 215's identity before authorizing access to payment service 224. In some embodiments, user 215 may use an image sensor 216 of user device 210 to capture an image of a POI document, which may be transmitted from user device 210 to service provider server 220 via network 202. Image sensor 216 may be, for example, one or more image sensors of a digital camera coupled to or integrated with device 210. In some cases, the image of the POI document may be stored in a memory of user device 210 (or other storage device (not shown) coupled thereto) and transmitted to server 220 from the memory or storage device.

In some embodiments, service provider server 220 includes a fraud detector 228 that analyzes the image of the POI document received from user 215 for purposes of forgery detection. The image analysis and forgery detection may be performed by fraud detector 228 as part of an automated identity verification process to verify user 215's identity in response to receiving a request for access to payment service 224 from user device 210 via network 202. Fraud detector 228 may be implemented as, for example, a fraud detection service that operates alongside other web services (e.g., payment service 224) at service provider server 220 to appropriately assess the risk of granting a user (e.g., user 215) access to the web services.

The default identity verification process performed by service provider server 220 may include, for example, extracting identification information from the image of the document, and then verifying the extracted information against information stored in DB 225 for a corresponding user account, if available. Having the user's identity verified through the POI document can greatly reduce the risk for service provider server 220. However, malicious users may circumvent the identity verification process by submitting a forged POI document to service provider server 220. The forgery may include falsifying information that appears on the POI document being submitted. Based on the information extracted from such a forged POI document image, service provider server 220 may unwittingly verify the user's identity and thus, incorrectly assess the risk of granting the user's request, which can lead to losses for the service provider, such as a security breach of service provider server 220, data losses, monetary losses, etc.

As such, before relying on the information from the document image, fraud detector 228 may be used to perform an image analysis and fraud detection process to determine whether the image of the document has been digitally manipulated or altered, e.g., after the image of the actual POI document has been captured using image sensor 216. For example, using image editing software, a malicious user can manipulate the pixel values in the image to change the information that appears on the POI document, e.g., by replacing the signature of the user with a computer-generated signature including fonts that appear as hand-written characters. Computer-generated signatures may appear visually identical to a hand-written signature and therefore, may be very difficult to detect by human reviewers and conventional forgery detection systems, which generally rely on making comparisons between the signature in the received image and a reference signature.

In contrast with such conventional solutions, the disclosed image analysis and fraud detection techniques use machine learning models to detect document forgeries that have digitally altered signatures, without requiring a reference signature for comparison. In some embodiments, the image analysis and fraud (or digital forgery) detection may be performed by fraud detector 228 using a multi-layered machine learning (ML) engine with different layers of machine learning models to detect whether the signature of the user in the document image has been digitally altered, as will be described in further detail below with respect to FIG. 3.

Figure 3:
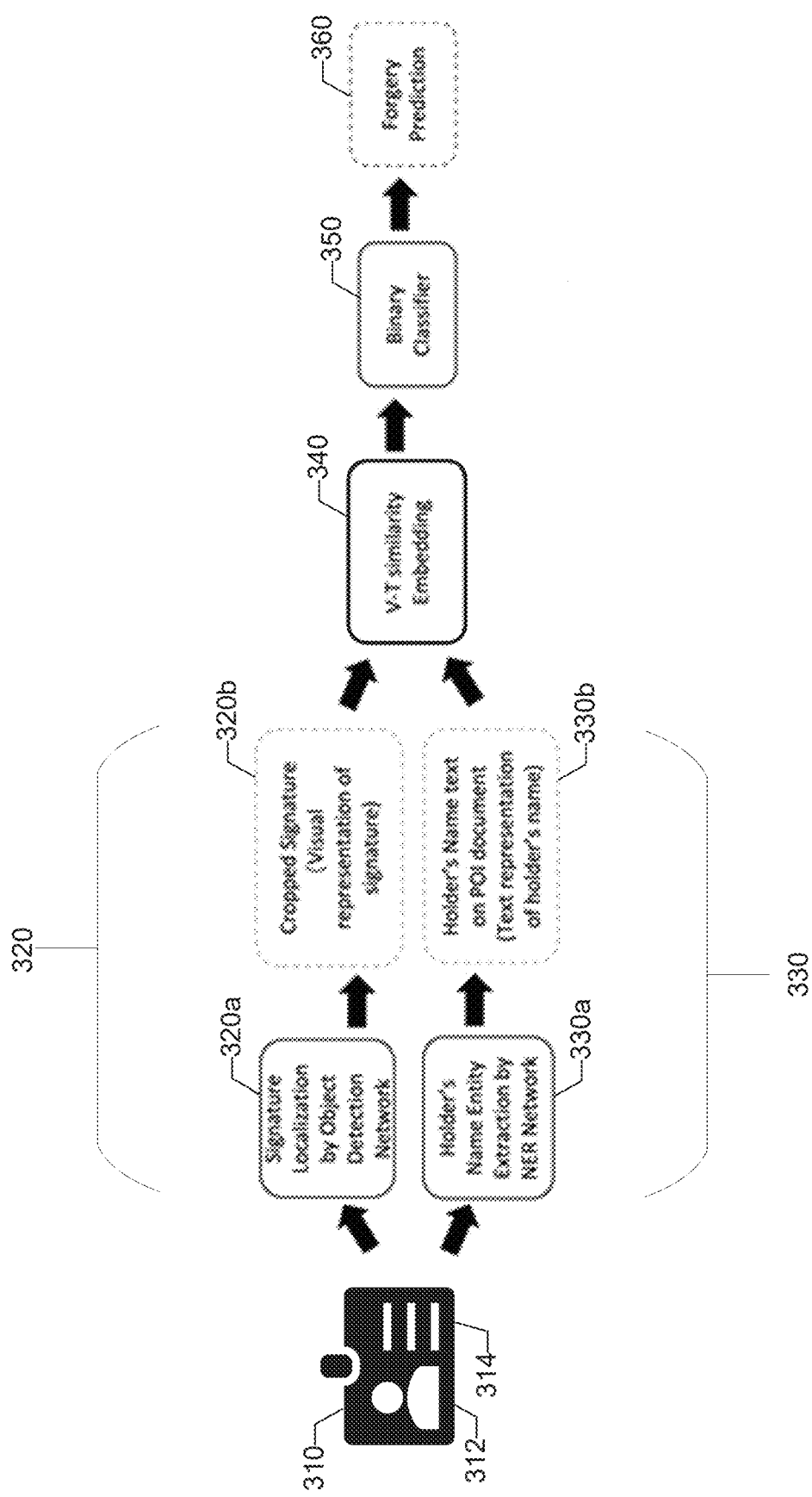
FIG. 3 is a block diagram of an illustrative workflow for signed document image analysis and fraud detection using different layers of a machine-learning engine, in accordance with one or more embodiments of the present disclosure.

FIG. 3 is a block diagram of an illustrative workflow 300 for signed document image analysis and fraud detection using different layers of an ML engine, in accordance with one or more embodiments of the present disclosure. Workflow 300 may be used, for example, to analyze an image 310 of a POI document for a user (e.g., user 215 of FIG. 2) requesting access to one or more web services (e.g., payment service 224 of FIG. 2) of a service provider. The POI document in this example may be any of various POI documents (e.g., driver's license, ID card, passport, etc.) with identification information, including a name and a signature of the user, which may be used to verify the user's identity. Image 310 may have been uploaded by the user to a website associated with the service provider or otherwise received from a device of the user, e.g., as part of a request for web service access received by service provider server 220 from user device 210 via network 202 of FIG. 2, as described above.

As shown in FIG. 3, image 310 may include different areas 312 and 314 that correspond to different types of identification information for the user as they appear on the POI document. The signature of the user within the POI document may correspond to an area 312 of image 310, e.g., above or below a portrait or photograph of the user's face. The name of the user may correspond to an area 314 of image 310. It should be appreciated that image 310 may include other areas corresponding to other types of identification information (e.g., mailing address, date of birth, etc.) on the POI document.

In some embodiments, the different layers of the ML engine may be used to implement the following four stages of workflow 300 for determining or predicting whether image 310 is a digital forgery of the POI document: (1) a stage 320 for signature localization; (2) a stage 330 for named entity recognition (NER); (3) a stage 340 for generating a visual-textual (V-T) similarity embedding representing the user's signature and name within; and (4) a stage 350 for classification using a binary classifier that outputs a forgery prediction 360 indicating whether or not image 310 is a digital forgery (e.g., based on a likelihood that the signature within image 310 has been digitally altered). It should be appreciated that the ML engine may include any number of layers with any of various pre-trained machine learning models in each layer, as desired for a particular implementation, and that the number of layers may be less than, greater than, or equivalent to the number of stages of workflow 300. In one example, the ML engine may have three layers for implementing stages 320, 330, 340, and 350 of workflow 300 as follows: a first layer for stages 320 and 330; a second layer for stage 340; and a third layer for stage 350. In another example, the four stages of workflow 300 may be implemented using four corresponding layers of the ML engine, i.e.: a first layer for stage 320; a second layer for stage 330; a third layer for stage 340; and a fourth layer for stage 350.

Stage 320 of workflow 300 may include first identifying or detecting the signature of the user within area 312 of image 310 (at a substage 320a) and then generating a visual representation of the signature (at a substage 320b). In some embodiments, an object detection model may be used to detect and localize the signature within area 312 of image 310 (at substage 320a). The output of the object detection model may then be used to generate the visual representation of the signature (at substage 320b). In some implementations, the object detection model may be a version of the You Only Look Once (YOLO) object detection model, e.g., YOLOv5, and the visual representation may be a cropped image of the localized signature from area 312 of image 310. It should be appreciated, however, that embodiments are not intended to be limited thereto and that any of various trained machine learning or neural network-based object detection models may be used for detecting instances of handwritten or computer-generated signatures in digital images.

In parallel with the signature detection and localization at stage 320, the name of the user may be detected within area 314 of image 310 at stage 330 of workflow 300. Stage 330 may include, for example, using a named entity recognition (NER) model to first detect the name of the user within area 314 of image 310 (at a substage 330a) and then generate a text representation of the detected name (at a substage 330b) based on the output of the NER model. The NER model may use various natural language processing techniques to parse image 310 for text corresponding to named entities and identify text corresponding to the name of the user within area 314 of image 310. In some implementations, the NER model may be a Bidirectional Encoder Representations from Transformers (BERT) model that is fine-tuned for detecting names of entities (e.g., people, places, organizations, etc.) from text, including sequences of characters or words identified within a digital image. In some embodiments, the object detection model and the NER model may be part of a first set of ML models included in a first layer of an ML engine for implementing stages 320 and 330, and their respective substages, of workflow 300.

In some embodiments, the NER model may be trained to identify and recognize named entities within the image. The NER model may be trained using training data, which may correspond to annotated training data having labels identifying different named entities of importance or relevance to the service provider. Training data may correspond to data from document images previously received from users of the service provider, which may have been annotated with labels for different named entities. When training the NER model, the training data may be processed to determine input attributes or features, which result in a classification, prediction, or other output associated with identifying words or groups of words (e.g., proper names of users) as named entities. This may include training one or more NER model layers having nodes connected by edges for decision making.

In some embodiments, the NER model may be re-trained and/or adjusted based on feedback. For example, a data scientist may determine whether, based on the input annotated data, the NER model is properly (e.g., to sufficient accuracy) identifying named entities. The NER model may also be trained using any of various ML model algorithms and trainers, e.g., from spaCy, NLTK, and/or Stanford NER. Alternatively, the NER model may be a pretrained ML model or an unsupervised ML model for performing NER to identify generic or predetermined named entities, without requiring any specialized training or re-training by the service provider. In this regard, a pretrained model may have been previously trained using more generic data or data that is not specific to the service provider to identify certain types of named entities. In such embodiments, the pretrained model may use similar training data to identify generic and/or task specific named entities.

The visual representation of the signature (e.g., cropped signature image) from substage 320b and the text representation of the user's name from substage 330b may then be used to generate a combined feature representation in the form of a visual-textual (V-T) similarity embedding at stage 340, as will be described in further detail below with respect to FIG. 4.

Figure 4:
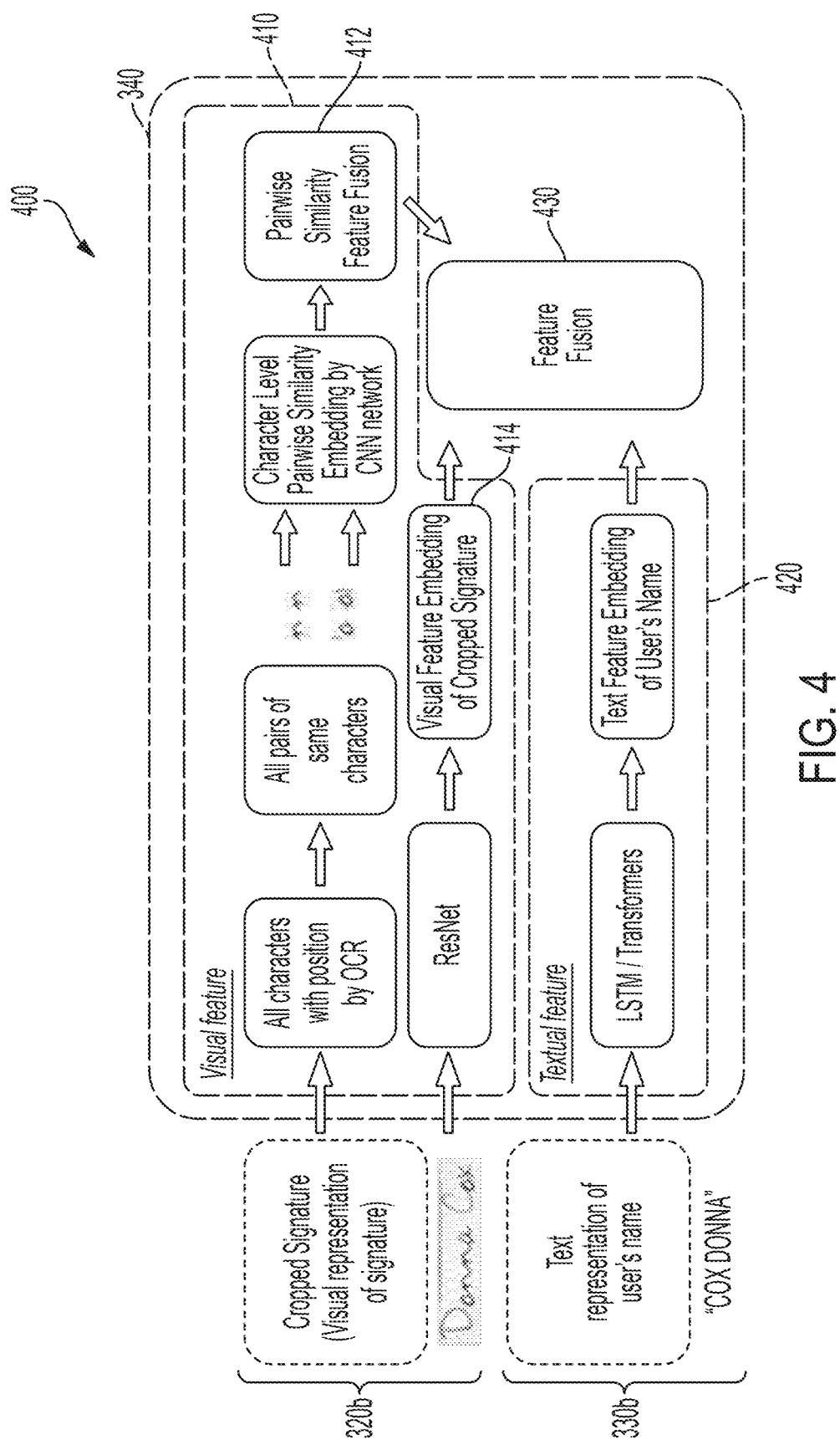
FIG. 4 is a block diagram of an illustrative workflow for generating a combined visual-textual feature embedding for document fraud detection, in accordance with one or more embodiments of the present disclosure.

FIG. 4 is a block diagram of an illustrative workflow 400 for generating a combined visual-textual (V-T) similarity embedding, in accordance with one or more embodiments of the present disclosure. The V-T similarity embedding may be generated from a combination of at least one visual feature 410 extracted from the visual representation of the signature (e.g., cropped signature image) generated in substage 320b of FIG. 3 and at least one textual feature 420 extracted from the text representation of the user's name generated in substage 330b of FIG. 3.

In some embodiments, visual feature(s) 410 may include a first visual feature 412 and a second visual feature 414 extracted using a second set of ML models included in a second layer of the ML engine described above. Visual feature 412 may be a character-level visual similarity feature of all the same or identical character pairs (or sets of the same character repeated in different portions of the cropped signature image). As will be described in further detail below, the V-T similarity embedding may be used to not only model the similarity between the text in the signature image and the text of the user's name on the POI document image (e.g., within areas 312 and 314 of image 310 of FIG. 3, respectively), but also model the similarity between pairs of visually identical characters forming the signature within the image or area thereof (e.g., within area 312 of image 310). An "identical character pair" here may refer to two or more instances of the same or a repeated character forming the signature within corresponding portions of the image or area thereof, e.g., as shown in FIG. 5.

Figure 5:
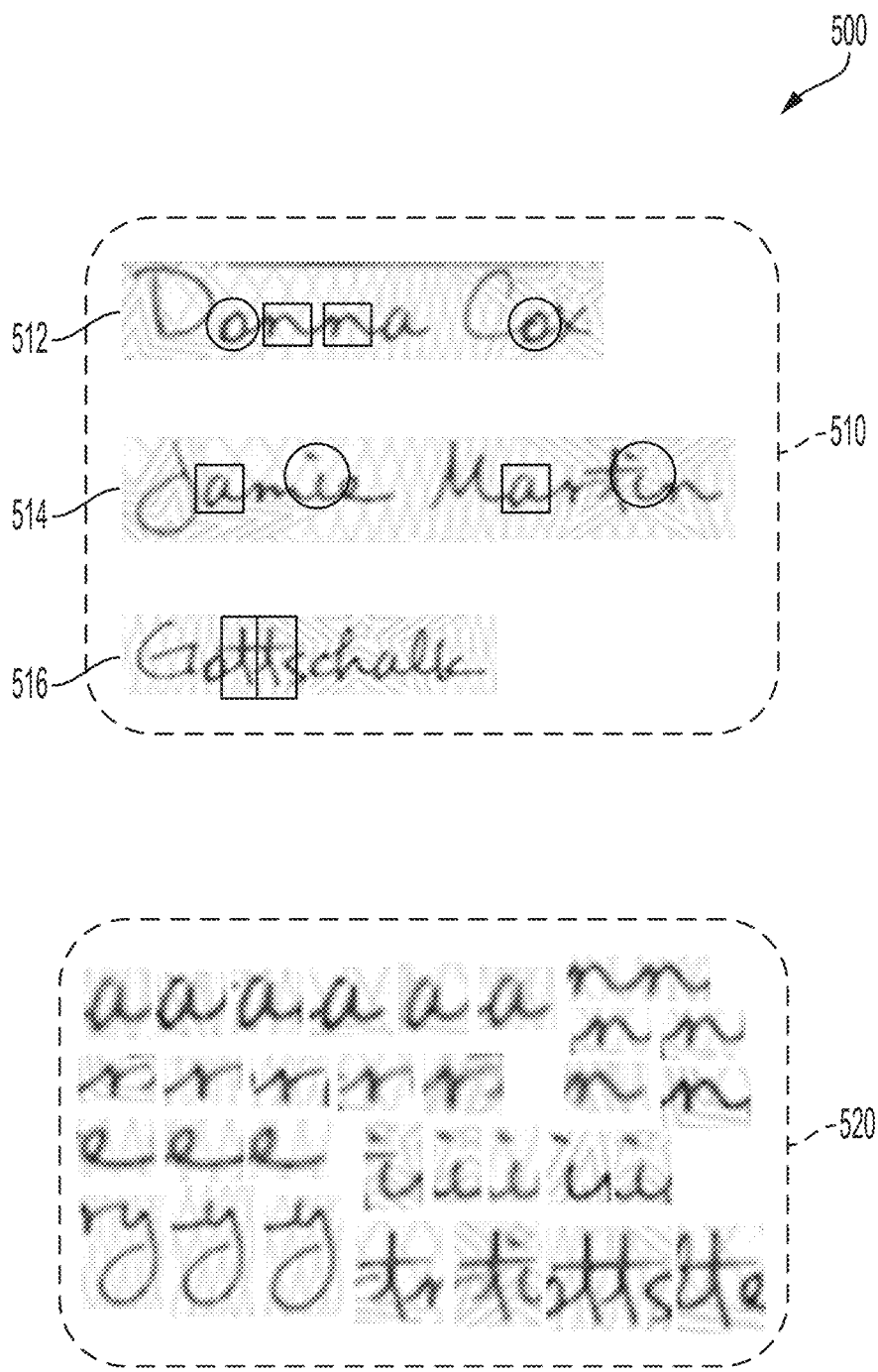
FIG. 5 shows an example of various computer-generated signatures that may be collected from different user identification (ID) documents and included in a training dataset for a machine learning (ML) based classifier, in accordance with one or more embodiments of the present disclosure.

FIG. 5 shows an example 500 of various computer-generated signatures 510 that may be used in place of the actual hand-written signatures on digitally altered or forged POI documents. As shown in FIG. 5, each of the computer-generated signatures 510 includes pairs of visually identical characters. For example, a signature 512 includes identical pairs of the letter "n" and the letter "o," a signature 514 includes identical pairs of the letter "a" and the letter "i," and a signature 516 includes an identical pair of the letter "t." It should be appreciated that the presence of visually identical characters is a critical feature of computer-generated signatures generally and that, while such characters are visually identical, they may be difficult to discern with the naked eye (by a human reviewer) or with conventional fraud detection techniques from an image of a signature on a POI document. Each of the computer-generated signatures 510 in FIG. 5 may be, for example, a cropped signature image extracted from an image of a POI document, e.g., from image 310 of FIG. 3 using the object detection model in stage 320 of workflow 300, as described above. An object character recognition (OCR) operation may also be performed on each cropped signature image to obtain a set of cropped character images 520 for all the characters and their corresponding positions within each signature. In some embodiments, computer-generated signatures 510 and characters 512 may be included in a training dataset for training a machine learning (ML) based classifier, e.g., the binary classifier at stage 350 of workflow 300, as will be described in further detail below.

Returning to FIG. 4, the OCR operation may be performed on the cropped signature image from substage 320b of workflow 300 as part of the extraction of the first visual feature 412 in workflow 400. For images of identical character pairs, e.g., for the pairs of "n" and "o" characters in signature 512 of FIG. 5, a 10-dimensional character level pairwise similarity embedding may be computed using a Convolutional Neural Network (CNN). Each dimension of such a character-level visual feature embedding may represent a similarity score having a value range between 0 and 1 for each pair of identical characters in this example. For a signature that does not have any identical characters (and each character is unique), the similarity score for each character and all 10 dimensions of the similarity embedding computed for visual feature 412 may be set to a value of 0. Intuitively, this step computes the similarity of image representations of a same character pair, and it models whether the two characters in the pair are visually identical. After obtaining all the character level pairwise similarity embeddings, all the embeddings may be fused by performing an element wise averaging operation to produce visual feature 412 as a fused character level similarity feature embedding. Such a character-level visual feature embedding may represent different instances of each repeated character forming the signature within corresponding portions of the image or area thereof (e.g., within area 312 of image 310 of FIG. 3, as described above). The character-level visual feature embedding may be, for example, a pairwise similarity embedding that includes a set of values computed by the CNN based on a visual similarity between the different instances of each repeated character forming the signature (e.g., between different instances of each of the "n" and "o" characters in signature 512) within the corresponding portions of area 312 of image 310 (or cropped signature image produced by substage 320b).

As shown in FIG. 4, the second visual feature 414 may be a word-level visual feature embedding extracted from the cropped signature image using, for example, a residual neural network (ResNet). The visual feature embedding in this example may be a low-dimensional feature of the entire cropped signature, e.g., a 512-dimensional visual feature embedding of the whole signature as it appears within area 312 of image 310.

In parallel with the extraction of visual features 410, textual feature 420 may be extracted from the text representation of the user's name. In some embodiments, textual feature 420 may be a textual feature embedding representing a text of the name of the user as it appears in the POI document image under analysis (e.g., within area 314 of image 310 of FIG. 3, as described above). In some implementations, the textual feature embedding may be a 512-dimensional textual feature embedding of the user's name computed or generated using a Long-Short Term Memory (LSTM) or transformer neural network.

The visual features 410 (including the character-level visual feature 412 and the word-level visual feature 414) may be combined with the textual feature 420 to produce a fusion 430 of all three features. Feature fusion 430 may be a combined visual-textual feature embedding generated from a combination of the character-level visual feature embedding (412), the word-level visual feature embedding (414), and the textual feature embedding (420). In some implementations, an element-wise multiplication operation may be performed to fuse the 512-dimensional visual feature embedding of the user's signature as a whole with the 512-dimensional textual feature embedding of the user's name. The fused feature may then be concatenated with the 10-dimensional fused character-level similarity feature embedding of the user's signature to form the final V-T similarity embedding. The V-T similarity embedding in this example not only models the similarity between the text in the signature image and the text of the user's name on the POI document image (e.g., within areas 312 and 314 of image 310, respectively), but also models the similarity of the image for each pair of same characters forming the signature within the image.

Returning to workflow 300 of FIG. 3, the V-T similarity embedding (or combined visual-textual feature representation of image 310) generated in stage 340 (e.g., using workflow 400 of FIG. 4, as described above) may then be passed to a binary classifier in stage 350 for binary classification. The output of the binary classifier in stage 350 may be a forgery prediction 360 indicating whether image 310 of the POI document is a digital forgery (or likelihood thereof). The binary classifier used in stage 350 may be, for example, a machine learning model trained using a training dataset. In some embodiments, the training dataset may include images of computer-generated signatures and characters (e.g., computer-generated signatures 510 and characters 512 of FIG. 5, as described above). In some implementations, the dataset may include images of POI documents sampled from actual document images received from users of a service provider (e.g., service provider of payment service 224 of FIG. 2, as described above). The images in the dataset may include subset of forged or digitally altered images with computer-generated signatures that were undetected using conventional fraud detection techniques of the service provider. In contrast with such conventional techniques, advantages of the disclosed fraud detection techniques, e.g., using workflows 300 and 400 of FIGS. 3 and 4, respectively, include, but are not limited to, the use of ML-based models to detect computer-generated signatures in images of signed documents with improved accuracy and without requiring any manual assistance, image post-processing, or reference signatures of individual users for comparison.

Figure 6:
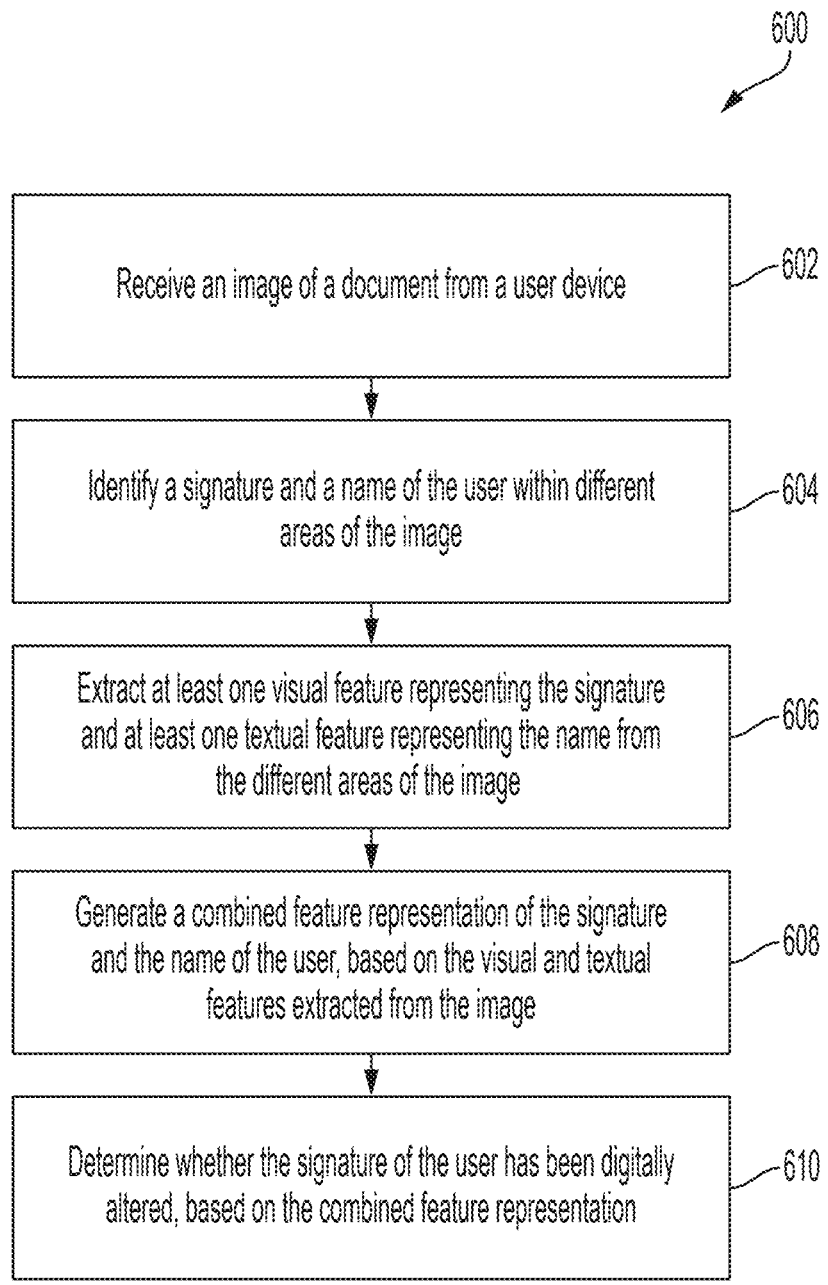
FIG. 6 is a flow diagram of a process for detecting fraudulent documents with digitally altered or forged signatures, in accordance with one or more embodiments of the present disclosure.

FIG. 6 is a flow diagram of a process 600 for detecting fraudulent documents with digitally altered or forged (computer-generated) signatures, in accordance with one or more embodiments of the present disclosure. For discussion purposes, process 600 will be described using system 200 of FIG. 2 and workflows 300 and 400 of FIGS. 3 and 4, respectively, as described above, but process 600 is not intended to be limited thereto. Process 600 may be performed by, for example, fraud detector 228 of service provider server 220 in system 200 of FIG. 2 using workflows 300 and 400 of FIGS. 3 and 4, respectively, as described above.

As shown in FIG. 6, process 600 begins in block 602, which includes receiving an image of a document from a device of a user (e.g., user device 210 of FIG. 2, as described above). In some embodiments, the document may be a POI document including a name and a signature of the user. The image of the document may be received from the user's device via a network (e.g., network 202 of FIG. 2, as described above) as part of a request for access to a web service of a service provider (e.g., the payment service provider associated with service provider server 220 of FIG. 2, as described above).

In block 604, a first layer of a machine learning engine may be used to identify the signature and the name of the user within different areas of the received image. In some embodiments, the first layer of the machine learning engine may include a first set of machine learning models. The first set of machine learning models may include, for example, an object detection model to generate a visual representation of the signature identified within a first area of the image (e.g., area 312 of image 310 of FIG. 3), and a named entity recognition (NER) model to generate a text representation of the name identified within a second area of the image (e.g., area 314 of image 310 of FIG. 3).

Process 600 may then proceed to block 606, which includes extracting a plurality of features from the identified areas of the image, where the plurality of features includes at least one visual feature representing the signature of the user and at least one textual feature representing the name of the user. In some embodiments, the second layer of the machine learning engine includes a second set of machine learning models. The second set of machine learning models may include, for example, at least one first neural network to extract the at least one visual feature of the signature from the visual representation generated by the object detection model, and at least one second neural network to extract the at least one textual feature of the name from the text representation generated by the NER model.

In some embodiments, the at least one visual feature of the signature may include, for example, a first visual feature (e.g., visual feature 412 of FIG. 4) and a second visual feature (e.g., visual feature 414 of FIG. 4) representing the signature within the first area of the image (e.g., area 312 of image 310 of FIG. 3). Accordingly, the at least one first neural network may include, for example, a convolutional neural network (CNN) to extract the first visual feature and a residual neural network (ResNet) to extract the second visual feature, as described above with respect to workflow 400 of FIG. 4. The first visual feature may be a character-level visual feature embedding representing different instances of each repeated character forming the signature within corresponding portions of the first area of the image, as described above. In some embodiments, the character-level visual feature embedding is a pairwise similarity embedding including a set of values computed by the at least one first neural network (e.g., the CNN) based on a visual similarity of each character to other characters forming the signature within the first area of the image. In some implementations, the character-level visual feature embedding may be generated using the CNN after performing an object character recognition (OCR) operation on the signature to obtain a cropped portion of the image for each character and a corresponding position of that character within the first area of the image. The second visual feature may be a word-level visual feature embedding representing the signature as a whole within the first area of the image. The at least one textual feature in this example may be a textual feature embedding representing a text of the name of the user within the second area of the image (e.g., area 314 of image 310 of FIG. 3). The second neural network in the second layer of the machine learning engine may be, for example, a long short-term memory (LSTM) network or a transformer neural network.

In block 608, the plurality of features (including the visual features of the user's signature and the textual feature of the user's name) extracted from the image may be used to generate a combined feature representation of the user's signature and name. In some embodiments, the combined feature representation is a combined visual-textual feature embedding generated from a combination of the character-level visual feature embedding, the word-level visual feature embedding, and the textual feature embedding. The combined visual-textual (V-T) feature embedding may be used to model not only a visual similarity between each character and other characters forming the signature within the first area of the image, but also model a textual similarity between the signature of the user within the first area of the image and the text of the name of the user within the second area of the image.

In block 610, a third layer of the machine learning engine may be used to determine whether the signature of the user has been digitally altered (and thus, whether the image is a digital forgery), based on the combined feature representation. In some embodiments, the third layer of the machine learning engine includes a trained machine learning model. The trained machine learning model may be, for example, a binary classification model, and the set of values computed by the at least one first neural network (e.g., the CNN, as described above) may include a set of binary values representing similarity relations between each character and the other characters within the signature. The binary classification model may output a forgery prediction indicating whether the signature in the first area of the image was digitally altered. The results of the determination in block 610 may then be used to process any request received from the user for accessing the service provider's web service. For example, if it is determined in block 610 that the signature of the user has been digitally altered (and the image is a digital forgery), any request for access to the service provider's web service may be restricted for the user. In some implementations, process 600 may be performed as part of a user identity verification process by the service provider and a notification indicating a failure to verify the user's identity and a denial of the request for access to the web service may be transmitted to the user's device.

Figure 7:
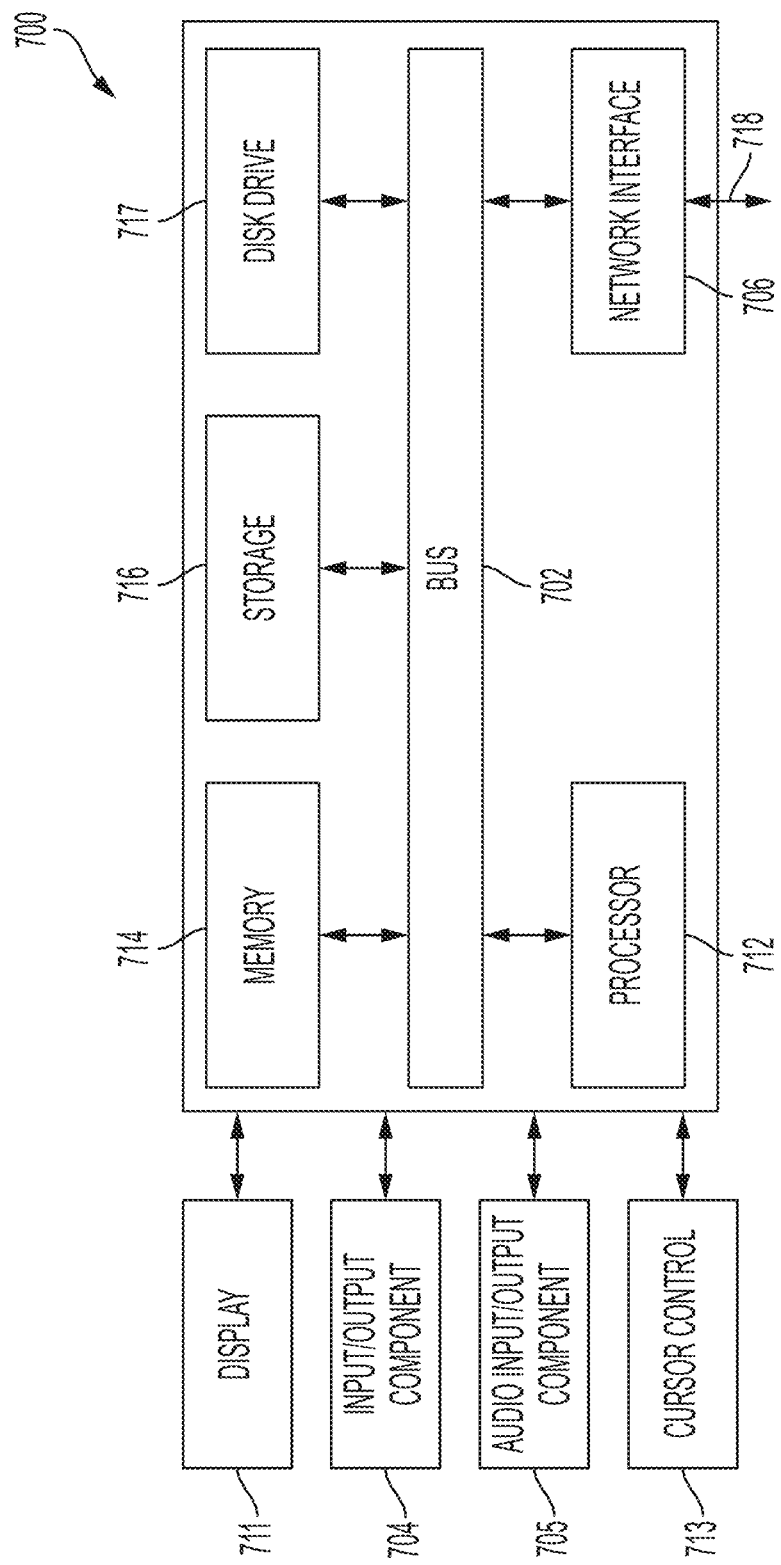
FIG. 7 is a block diagram of a computer system in which embodiments of the present disclosure may be implemented.

FIG. 7 is a block diagram of a computer system 700 in which embodiments of the present disclosure may be implemented. Computer system 700 may be suitable for implementing, for example, one or more components of the devices and servers in systems 100 and 200 of FIGS. 1 and 2, respectively, according to various implementations of the present disclosure. Computer system 700 may also be suitable for implementing workflows 300 and 400 of FIGS. 3 and 4, respectively, and process 600 of FIG. 6, as described above. In various implementations, a client or user device may comprise a personal computing device e.g., smart phone, a computing tablet, a personal computer, laptop, a wearable computing device such as glasses or a watch, Bluetooth device, key FOB, badge, etc.) capable of communicating with a service provider over a network, e.g., network 102 or 202 of system 100 or 200, respectively. The service provider may utilize a network computing device (e.g., a network server) capable of communicating with the network. It should be appreciated that each of the devices utilized by users and service providers may be implemented as computer system 700 in a manner as follows:

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a server (e.g., service provider server 220 of FIG. 2, as described above) via a network (e.g., network 202 of FIG. 2, as described above). In some implementations, the signal transmission may be wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one implementation, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 700. In various other implementations of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Although the various components of computer system 700 are described separately, it should be appreciated that the functionality of the various components may be combined and/or performed by a single component and/or multiple computing devices in communication with one another, as desired for a particular implementation.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
one or more hardware processors; and
a non-transitory memory having stored therein instructions that are executable by the one or more hardware processors to cause the system to perform operations comprising:
receiving, from a device of a user, a request for accessing a computer service, wherein the request comprises an image of a document including a name and a signature;
detecting the signature and the name within different areas of the image;
generating a combined feature representation of the signature and the name detected within the different areas of the image, wherein the combined feature representation comprises a combination of at least one visual feature of the signature and at least one textual feature of the name;
determining, using a machine learning model, whether the signature has been digitally altered based on the combined feature representation; and
based on whether the signature has been digitally altered, providing access to the computer service or restricting access to the computer service via the device.

2. The system of claim 1, wherein the operations further comprise:
generating, using an object detection model, a visual representation of the signature detected within a first area of the image; and
generating, using a named entity recognition (NER) model, a text representation of the name detected within a second area of the image.

3. The system of claim 2, wherein the operations further comprise:
extracting, using a first neural network, the at least one visual feature of the signature from the visual representation; and
extracting, using a second neural network, the at least one textual feature of the name from the text representation.

4. The system of claim 1, wherein the at least one visual feature of the signature includes a first visual feature and a second visual feature, and wherein:
the first visual feature is a character-level visual feature embedding representing one or more instances of each character forming the signature within corresponding portions of a first area of the image;
the second visual feature is a word-level visual feature embedding representing the signature as a whole within the first area of the image; and
the at least one textual feature is a textual feature embedding representing a text of the name within a second area of the image.

5. The system of claim 4, wherein the character-level visual feature embedding is a pairwise similarity embedding including a set of values computed by a first neural network based on a visual similarity of each character to other characters forming the signature within the first area of the image.

6. The system of claim 5, wherein the set of values computed by the first neural network is a set of binary values.

7. The system of claim 4, wherein the combined feature representation is generated based on a combination of the character-level visual feature embedding, the word-level visual feature embedding, and the textual feature embedding.

8. The system of claim 1, wherein the combined feature representation represents: (i) a visual similarity between each character and other characters forming the signature within a first area of the image and (ii) a textual similarity between the signature within the first area of the image and a text of the name within a second area of the image.

9. A method comprising:
receiving, by a server and via a network from a device of a user, a request for access to a web service, the request including an image of a document with identification information for the user, the identification information including a name of the user and a signature of the user;
detecting, by the server, the name and the signature of the user within different areas of the image;
generating a combined feature representation of the name and the signature detected within the different areas of the image, the combined feature representation including a combination of at least one visual feature of the signature and at least one textual feature of the name;
determining, using a trained machine learning model, whether the signature of the user has been digitally altered based on the combined feature representation; and
restricting access to the web service in response to determining that the signature of the user has been digitally altered.

10. The method of claim 9, wherein the signature of the user is detected within a first area of the image using an object detection model, and wherein the name of the user is detected within a second area of the image using a named entity recognition (NER) model.

11. The method of claim 9, wherein the generating the combined feature representation comprises:
extracting the at least one visual feature of the signature from a first area of the image; and extracting the at least one textual feature of the name from a second area of the image.

12. The method of claim 9, wherein the at least one visual feature of the signature includes a first visual feature and a second visual feature extracted from a first area of the image, and wherein:
the first visual feature is a character-level visual feature embedding representing a visual similarity between characters forming the signature;
the second visual feature is a word-level visual feature embedding representing the signature as a whole; and
the at least one textual feature is a textual feature embedding representing a text of the name of the user.

13. The method of claim 12, wherein the combined feature representation represents:
the visual similarity between the characters forming the signature within the first area of the image; and
a textual similarity between the signature of the user within the first area of the image and the text of the name of the user within a second area of the image.

14. The method of claim 12, wherein the character-level visual feature embedding is a pairwise visual similarity embedding including a set of values computed by a convolutional neural network (CNN) based on the visual similarity between the characters forming the signature.

15. The method of claim 14, wherein the character-level visual feature embedding is generated using the CNN after obtaining a cropped portion of the image for each character and a corresponding position of the character within the first area of the image.

16. The method of claim 14, wherein the trained machine learning model is a binary classifier, and wherein the set of values computed by the CNN is a set of binary values representing similarity relations between each character and other characters forming the signature.

17. A non-transitory machine-readable medium having stored thereon machine-readable instructions executable to cause a machine to perform operations comprising:
receiving, via a network from a device of a user, a request for access to a web service, the request including an image of a document, the document including a name of the user and a signature of the user;
detecting, using a first layer of a machine learning engine, the name and the signature of the user within different areas of the image;
generating, using a second layer of the machine learning engine, a combined feature representation of the name and the signature detected within the different areas of the image, the combined feature representation including at least one visual feature of the signature and at least one textual feature of the name;
determining, using a third layer of the machine learning engine, whether the image is a digital forgery based on the combined feature representation, wherein the third layer of the machine learning engine includes a binary classification model configured to generate a forgery prediction indicating whether the signature has been digitally altered based on the combined feature representation; and
processing the request for access to the web service based on the determining whether the image is a digital forgery, wherein the processing comprises restricting access to the web service in response to determining that the signature is a digital forgery.

18. The non-transitory machine-readable medium of claim 17, wherein the first layer of the machine learning engine includes a first set of machine learning models, and wherein the first set of machine learning models includes:
an object detection model configured to generate a visual representation of the signature detected within a first area of the image; and
a named entity recognition (NER) model configured to generate a text representation of the name detected within a second area of the image.

19. The non-transitory machine-readable medium of claim 18, wherein the second layer of the machine learning engine includes a second set of machine learning models, and wherein the second set of machine learning models includes:
a first neural network configured to extract the at least one visual feature of the signature from the visual representation generated by the object detection model; and
a second neural network configured to extract the at least one textual feature of the name from the text representation generated by the NER model.

20. The non-transitory machine-readable medium of claim 17, wherein the at least one visual feature of the signature includes a first visual feature and a second visual feature, and wherein:
the first visual feature is a character-level visual feature embedding representing one or more instances of each character forming the signature within corresponding portions of a first area of the image;
the second visual feature is a word-level visual feature embedding representing the signature as a whole within the first area of the image; and
the at least one textual feature is a textual feature embedding representing a text of the name within a second area of the image.

* * * * *